United States Patent
Park et al.

(10) Patent No.: US 11,827,825 B2
(45) Date of Patent: Nov. 28, 2023

(54) QUANTUM-DOT BASED ON MULTI-SHELL STRUCTURE INCLUDING LUMINESCENT DOPANT

(71) Applicant: IUCF-HYU (INDUSTRY-UNIVERSITY COOPERATION FOUNDATION HANYANG UNIVERSITY), Seoul (KR)

(72) Inventors: Jea Gun Park, Seongnam-si (KR); Seung Jae Lee, Seoul (KR); Ji Eun Lee, Seoul (KR); Chang Jin Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 501 days.

(21) Appl. No.: 17/043,273

(22) PCT Filed: May 22, 2020

(86) PCT No.: PCT/KR2020/006684
§ 371 (c)(1),
(2) Date: Sep. 29, 2020

(87) PCT Pub. No.: WO2021/210722
PCT Pub. Date: Oct. 21, 2021

(65) Prior Publication Data
US 2023/0098866 A1 Mar. 30, 2023

(30) Foreign Application Priority Data
Apr. 13, 2020 (KR) .................. 10-2020-0044682

(51) Int. Cl.
*C09K 11/61* (2006.01)
*C09K 11/08* (2006.01)
(Continued)

(52) U.S. Cl.
CPC ........ *C09K 11/616* (2013.01); *C09K 11/0883* (2013.01); *C09K 11/55* (2013.01);
(Continued)

(58) Field of Classification Search
CPC ..... C09K 11/705; C09K 11/616; C09K 11/55; C09K 11/883
See application file for complete search history.

(56) References Cited

U.S. PATENT DOCUMENTS

2007/0194279 A1 8/2007 Peng et al.
2008/0305334 A1 12/2008 Jang et al.
(Continued)

FOREIGN PATENT DOCUMENTS

CN 104974759 B 5/2017
CN 106957652 A 7/2017
(Continued)

OTHER PUBLICATIONS

Office Action dated Jul. 19, 2022 issued by the Japanese Patent Office in Japanese Application No. 2020-552709.
(Continued)

*Primary Examiner* — C Melissa Koslow
(74) *Attorney, Agent, or Firm* — Sughrue Mion, PLLC

(57) ABSTRACT

Disclosed are quantum dots including a luminescent dopant. More particularly, each of the quantum dots according to an embodiment of the present invention includes a core and a shell surrounding the core, wherein at least one of an interior of the core and an interface between the core and the shell is doped with a luminescent group I dopant.

9 Claims, 5 Drawing Sheets

(51) Int. Cl.
*C09K 11/55* (2006.01)
*C09K 11/70* (2006.01)
*B82Y 20/00* (2011.01)
*B82Y 40/00* (2011.01)

(52) U.S. Cl.
CPC ............ *C09K 11/705* (2013.01); *B82Y 20/00* (2013.01); *B82Y 40/00* (2013.01)

(56) References Cited

U.S. PATENT DOCUMENTS

| 2017/0121598 | A1 | 5/2017 | Min et al. | |
|---|---|---|---|---|
| 2017/0179338 | A1* | 6/2017 | Park | C09K 11/615 |
| 2018/0163129 | A1* | 6/2018 | Won | H01L 31/0384 |

FOREIGN PATENT DOCUMENTS

| CN | 107022354 A | 8/2017 |
|---|---|---|
| CN | 108219769 A | 6/2018 |
| KR | 10-2008-0107578 A | 12/2008 |
| KR | 10-1060231 B1 | 8/2011 |
| KR | 10-1525524 B1 | 6/2015 |
| KR | 10-2017-0049452 A | 5/2017 |
| KR | 10-1774775 B1 | 9/2017 |
| KR | 10-2018-0068893 A | 6/2018 |
| KR | 10-1984990 B | 9/2019 |
| KR | 10-2019-0136881 A | 12/2019 |
| KR | 10-2020-0016057 A | 2/2020 |
| KR | 10-2020-0034398 A | 3/2020 |
| TW | 201333170 A1 | 8/2013 |
| TW | 201825649 A | 7/2018 |

OTHER PUBLICATIONS

Office Action dated Apr. 19, 2021 in Taiwanese Application No. 109133801.
Office Action dated Jan. 10, 2023 from the China National Intellectual Property Administration in CN Application No. 202080002141.0.

* cited by examiner

[FIG. 1]
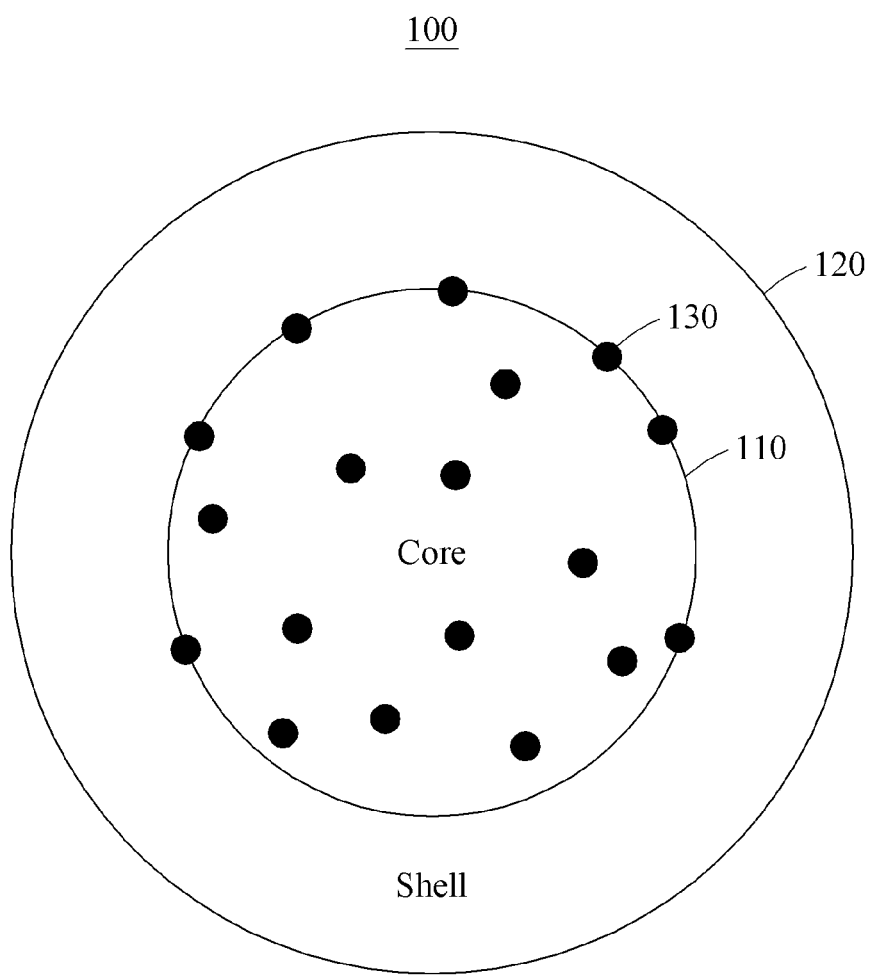

[FIG. 2]
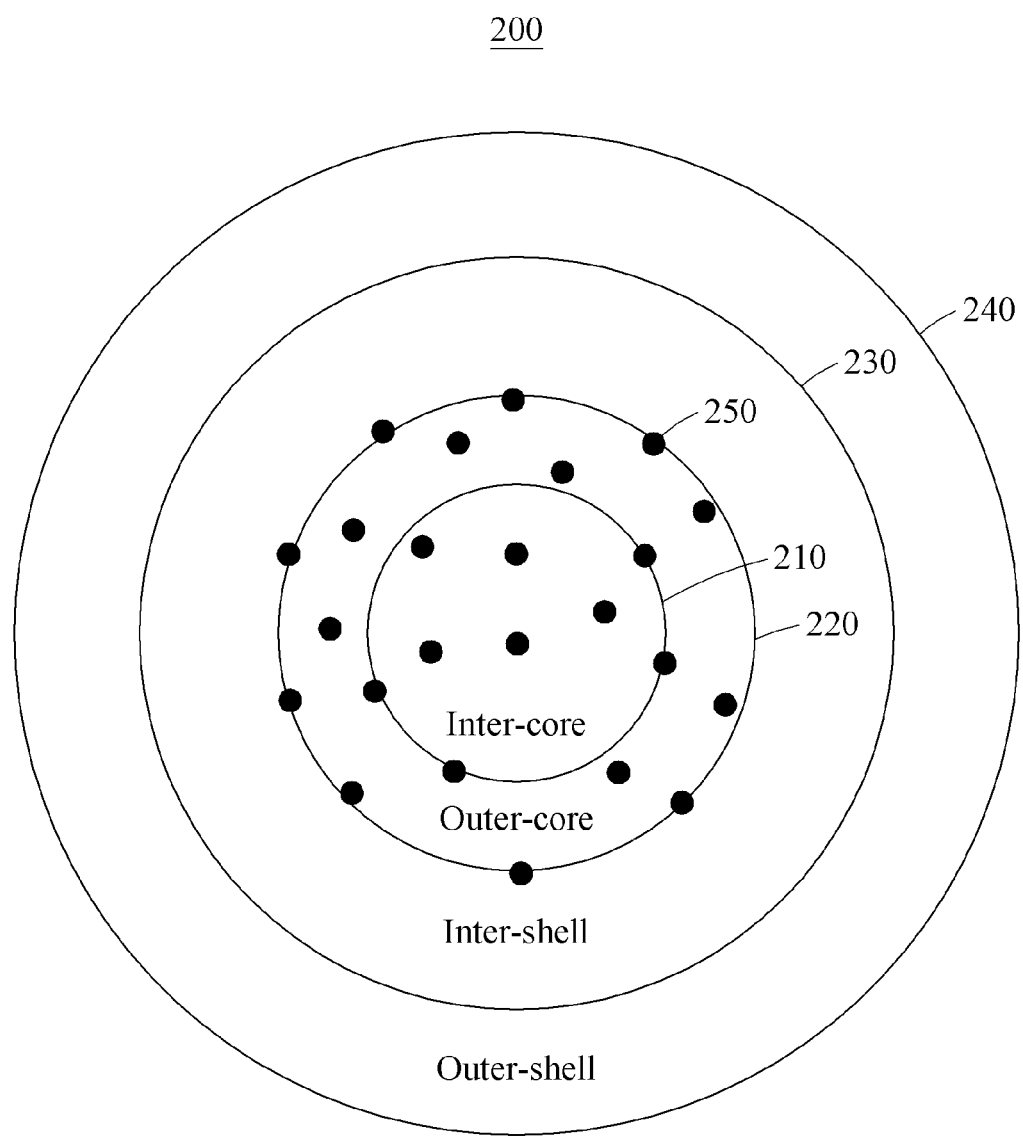

[FIG. 3A]
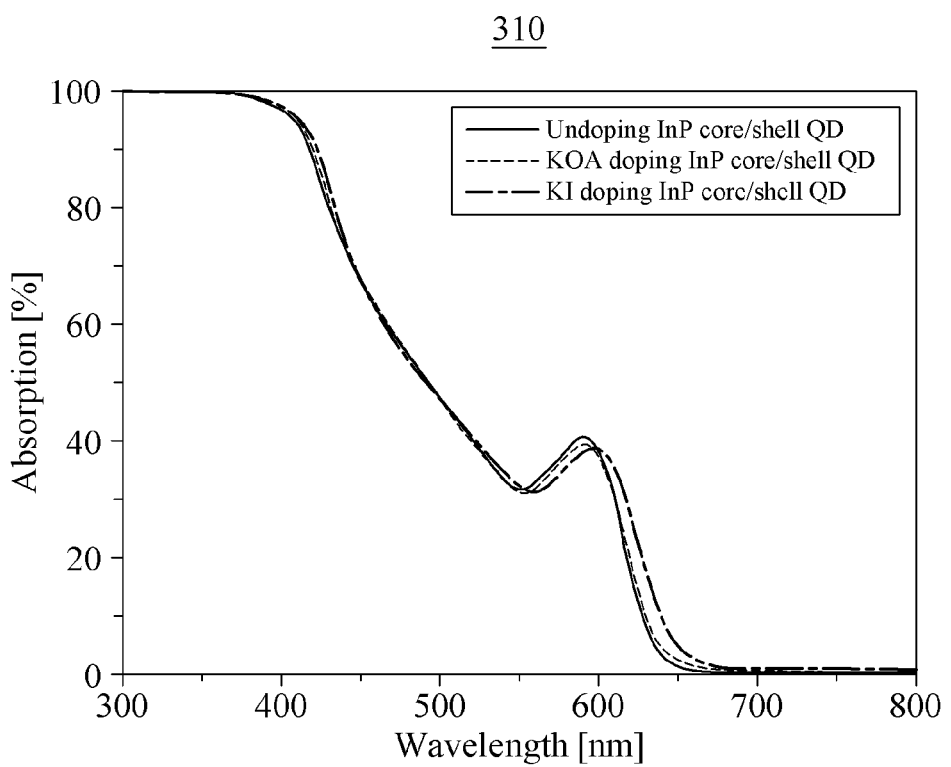

[FIG. 3B]
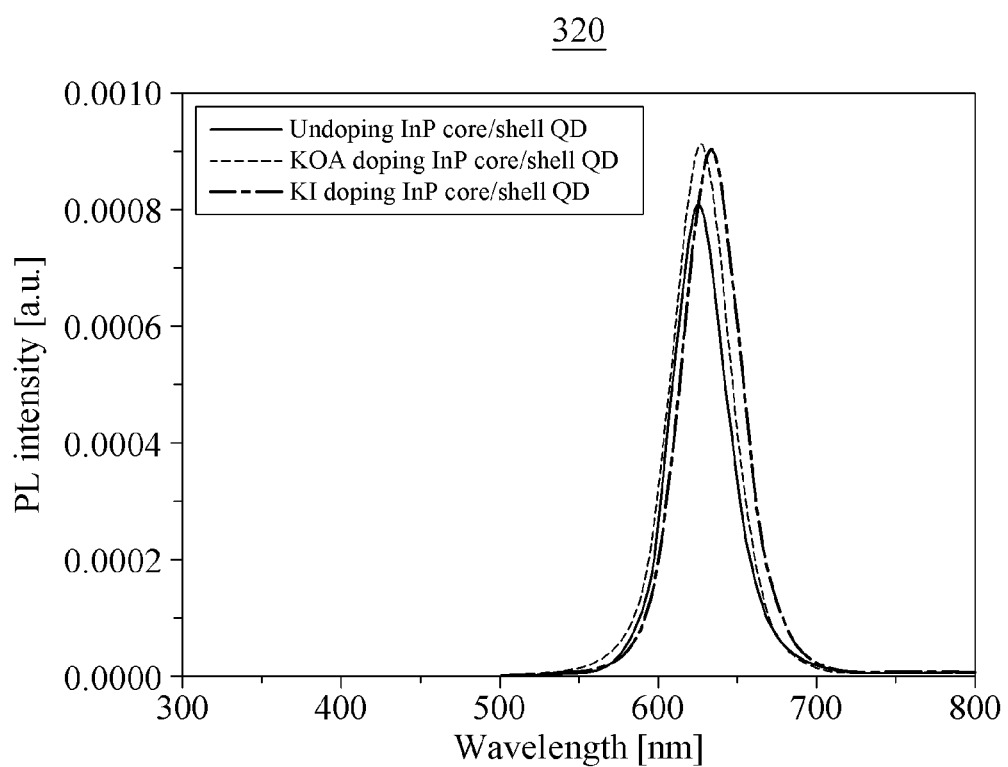

[FIG. 4]
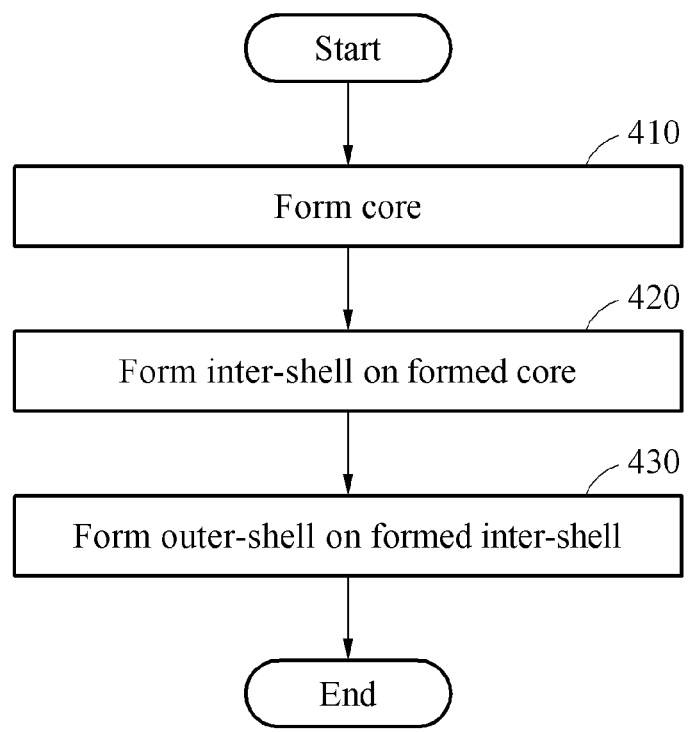

QUANTUM-DOT BASED ON MULTI-SHELL STRUCTURE INCLUDING LUMINESCENT DOPANT

CROSS-REFERENCE TO RELATED APPLICATION

This application is a National Stage Entry of PCT International Application No. PCT/KR2020/006684, which was filed on May 22, 2020, and which claims priority to Korean Patent Application No. 10-2020-0044682, filed on Apr. 13, 2020 in the Korean Intellectual Property Office, the disclosure of which is incorporated herein by reference.

TECHNICAL FIELD

The present invention relates to quantum dots, and more particularly to quantum dots based on a multi-shell structure including a luminescent dopant.

BACKGROUND ART

Quantum dots, which are colloidal semiconductor crystals, have sizes of several nanometers to tens of nanometers, and have advantages such as high color purity, color reproducibility, and light stability.

In particular, semiconductor crystals composed of quantum dots can be controlled to emit a wide range of light emission wavelengths by adjusting particle sizes thereof and can be easily fabricated through a solution process. Accordingly, quantum dots have attracted attention as a next-generation light-emitting material.

Meanwhile, in the case of red-emitting quantum dots based on an existing indium phosphide (InP) compound, the size of cores is larger than in green quantum dots because emission wavelengths should be red-shifted.

Accordingly, in the case of red-emitting quantum dots, lattice mismatch caused by a difference between core/shell lattice constants increases due to increased crystallinity according to an increased core size.

Such lattice mismatch causes crystal strain, thereby limiting crystal epitaxial growth and causing phonon vibration in crystals, resulting in deterioration in light emitting properties due to photon scattering.

That is, it is necessary to minimize crystal strain so as to improve optical characteristics of quantum dots.

DISCLOSURE

Technical Problem

Therefore, the present invention has been made in view of the above problems, and it is one object of the present invention to provide quantum dots, in which an interior of a core and an interface between the core and a shell are doped with a luminescent group I dopant, thereby being capable of minimizing crystal strain.

It is another object of the present invention to provide quantum dots doped with a luminescent group I dopant to improve optical characteristics including quantum yield.

Technical Solution

In accordance with an aspect of the present invention, the above and other objects can be accomplished by the provision of a quantum dot, comprising a core; and a shell surrounding the core, wherein at least one of an interior of the core and an interface between the core and the shell is doped with a luminescent group I dopant, wherein the luminescent group I dopant may include one or more of KI, KF, KCl, KBr, $KPF_6$, $KPI_6$, $KPCl_6$, $KPBr_6$ and combinations thereof.

The luminescent group I dopant may be doped at a concentration of 0.1% to 10% relative to a cation of the core.

The core may include at least one of a group III-V compound, a group II-VI compound, a group II-III-IV compound, a group III-III-IV compound and combinations thereof.

The core may include an inner-core comprising an $In_aP_b$ compound, where a and b are positive real numbers, and an outer-core comprising an $In_cP_d$ compound, where c and d are positive real numbers satisfying a>c and b>d.

The shell may include at least one of a group II-VI compound, a group II-III-VI compound, a group compound III-III-II-VI compound and combinations thereof.

The shell may include an inter-shell; and an outer-shell surrounding the inter-shell.

The inter-shell may include at least one of a group II-III-VI compound, a group III-III-II-VI compound and combinations thereof, and the outer-shell may include a group II-VI compound.

Advantageous Effects

Since an interior of a core of each of quantum dots according to the present invention and an interface between the core and a shell thereof are doped with a luminescent group I dopant, crystal strain can be minimized.

In addition, optical characteristics including quantum yield can be improved due to doping with a luminescent group I dopant.

DESCRIPTION OF DRAWINGS

FIG. 1 illustrates a quantum dot according to an embodiment of the present invention.

FIG. 2 illustrates a quantum dot according to another embodiment of the present invention.

FIGS. 3A to 3B illustrate optical characteristics of quantum dots according to an embodiment of the present invention.

FIG. 4 illustrate a method of manufacturing quantum dots according to an embodiment of the present invention.

BEST MODE

The embodiments will be described in detail herein with reference to the drawings.

However, it should be understood that the present disclosure is not limited to the embodiments according to the concept of the present disclosure, but includes changes, equivalents, or alternatives falling within the spirit and scope of the present disclosure.

In the following description of the present disclosure, a detailed description of known functions and configurations incorporated herein will be omitted when it may make the subject matter of the present disclosure unclear.

The terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), it may be directly connected or coupled to the other element or an intervening element (e.g., third) may be present.

As used herein, "configured to" may be used interchangeably with, for example, "suitable for", "ability to", "changed to", "made to", "capable of", or "designed to" in terms of hardware or software.

In some situations, the expression "device configured to" may mean that the device "may do ~" with other devices or components.

For example, in the sentence "processor configured to perform A, B, and C", the processor may refer to a general purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or".

That is, unless otherwise mentioned or clearly inferred from context, the expression "x uses a or b" means any one of natural inclusive permutations.

In the above-described specific embodiments, elements included in the invention are expressed singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present invention has been described with reference to exemplary embodiments, but it should be understood that various modifications may be made without departing from the scope of the present disclosure.

Therefore, the scope of the present invention should not be limited by the embodiments, but should be determined by the following claims and equivalents to the following claims.

FIG. 1 illustrates a quantum dot according to an embodiment of the present invention.

Referring to FIG. 1, since a luminescent group I dopant is doped inside a core of a quantum dot 100 according to an embodiment and at an interface between the core and a shell thereof, crystal strain can be minimized.

In addition, since the quantum dot 100 is doped with the luminescent group I dopant, optical characteristics including quantum yield can be improved.

Groups described below refer to groups on the periodic table.

In addition, 'group I' may include group IA and group IB, and 'group I' elements may include, for example, Li, Na, K, Ru, and Cs, but the present invention is not limited thereto.

'Group II' may include group IIA and group IIB, and group II elements may include, for example, Cd, Zn, Hg and Mg, but the present invention is not limited thereto.

'Group III' may include group IIIA and group IIIB, and group III elements may include, for example, Al, In, Ga, and Tl, but the present invention is not limited thereto.

'Group IV' may include group IVA and IVB, and group IV elements may include, for example, Si, Ge and Sn, but the present invention is not limited thereto.

'Group V' may include group VA, and group V elements may include, for example, N, P, As, Sb and Bi, but the present invention is not limited thereto.

'Group VI' may include group VIA, and group VI elements may include, for example, S, Se and Te, but the present invention is not limited thereto.

The quantum dot 100 according to an embodiment includes a core 110 and a shell 120 surrounding the core 110, wherein at least one of an interior of the core 110 and an interface between the core 110 and the shell 120 may be doped with a luminescent group I dopant 130. For example, the luminescent group I dopant 130 may be a salt combined with a halide-based anion based on a potassium (K) metal. In addition, the quantum dot 100 may be a red-emitting quantum dot.

In particular, in the case of a process of doping a core/shell interface or an interior of a shell through injection of a halogen ion dopant after growth of an InP core, a dopant is mainly F-ions which are halide ions, and a doping site may be an interior of the shell.

On the other hand, since the group I K+ dopant is injected in a core growth process of the present invention, doping is simultaneously performed when core growth is performed. Here, the dopant may be mainly a group I $K^+$ ion and may be a salt (potassium halide) combined with a halide anion.

Preferably, both an interior of the core 110 and an interface between the core 110 and the shell 120 may be doped with the luminescent group I dopant 130.

In addition, the luminescent group I dopant 130 may include at least one of KI, KF, KCl, KBr, $KPF_6$, $KPI_6$, $KPCl_6$, $KPBr_6$ and combinations thereof.

The luminescent group I dopant 130 may be doped at a doping concentration of 0.1% to 10% relative to a cation ($In^{3+}$) of the core 110.

In particular, when the luminescent group I dopant 130 is doped at a high concentration, it may cause an interstitial defect, unlike intended, thereby deteriorating optical characteristics.

On the other hand, since the luminescent group I dopant 130 of the present invention is doped at an appropriate doping concentration (0.1% to 10% relative to the cation of the core) to passivate a generated crystal defect (vacancy), scattering may be reduced during emission of photons having a specific wavelength, thereby improving a quantum yield and full width at half maximum (FWHM).

The core 110 may include at least one of group III-V compounds, group II-VI compounds, group II-III-VI compounds, group III-III-II-VI compounds and combinations thereof.

For example, the group III-V compounds may include at least one of binary compounds selected from GaN, GaP, GaAs, GaSb, AlN, AlP, AlAs, AlSb, InN, InP, InAs, InSb and combinations thereof, ternary compounds selected from GaNP, GaNAs, GaNSb, GaPAs, GaPSb, AlNP, AlNAs, AlNSb, AlPAs, AlPSb, InGaP, InNP, InNAs, InNSb, InPAs, InPSb and combinations thereof, and quaternary compounds selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and combinations thereof.

In addition, the group II-VI compounds may include at least one of binary compounds selected from CdSe, CdTe, ZnO, ZnS, ZnSe, ZnTe, HgS, HgSe, HgTe, MgSe, MgS and combinations thereof, ternary compounds selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and combinations thereof, and quaternary compounds selected from HgZnTeS, CdZnSeS, CdZnSeTe, CdZnSTe, CdHgSeS, CdHgSeTe, CdHgSTe, HgZnSeS, HgZnSeTe, HgZnSTe and combinations thereof.

More particularly, the core 110 may include at least one of an InP compound, an InGaP compound, an InAlP compound, an InBP compound and a GaP compound, preferably an InP compound.

The core 110 may be formed in a multilayer form including an inner-core and an outer-core.

For example, the outer core may be implemented to have the same band gap and structure as the inner-core and to have a relatively thin thickness compared to the inner-core.

More particularly, when a core size corresponding to a desired red wavelength (620 nm to 630 nm) energy band-gap is formed with a single core, a very wide core size distribution (FWHM increase) may occur due to Ostwald ripening.

On the other hand, a core size corresponding to a desired red wavelength (620 nm to 630 nm) energy band-gap may be formed (adjusted) while maintaining a uniform size distribution, by suppressing Ostwald ripening through a multilayer core process.

The luminescent group I dopant 130 may be doped in interiors of an inner-core and an outer-core, at an interface between the inner-core and the outer-core and at an interface between the outer-core and the shell 120.

Meanwhile, the inner-core may include an $In_aP_b$ compound, where a and b are positive real numbers, and the outer-core may include an $In_cP_d$ compound, where c and d are positive real numbers satisfying a>c and b>d. Preferably, $0.30<a<0.40$, $0.25<b<0.35$, $0.15<c<0.20$, and $0.125<d<0.175$.

The shell 120 may include at least one of a group II-VI compound, a group II-III-VI compound, a group III-III-II-VI compound and combinations thereof.

The shell 120 may include an inter-shell and an outer-shell surrounding the inter-shell, wherein the inter-shell may be formed to have a multilayer structure.

The inter-shell may include at least one of a group II-III-VI compound, a group III-III-II-VI compound and combinations thereof, and the outer-shell may include a group II-VI compound.

For example, the inter-shell may include a ZnSe compound, a ZnSeS compound, a ZnTe compound, a ZnTeSe compound, a ZnTeSeS compound and a ZnTeS compound, and the outer-shell may include a ZnS compound. Preferably, the inter-shell may include a ZnSe compound and a ZnSeS compound.

In addition, a composition ratio of the core 110 of the inter shell and the outer shell in the multishell structure may be designed to minimize lattice mismatch therebetween. Accordingly, uniform epitaxial growth may be realized by minimizing lattice mismatch, whereby improvement in optical characteristics (quantum yield increase and half-width reduction) may be anticipated.

More particularly, the inter-shell may be formed to have a $Zn_eSe_f/Zn_gSe_hS_i/Zn_jSe_kS_l$ multilayer structure, where e, f, g, h, i, j, k, and l are positive real numbers satisfying g=j, h>k, and i<l. Preferably, $0.2<e<1.5$, $0.15<f<1.0$, $0.1<g<0.5$, $0.005<h<0.020$, $0.5<i<2.0$, $0.1<j<0.5$, $0.0025<k<0.010$, and $1.0<l<4.0$.

In addition, the $Zn_eSe_f$ layer of the inter-shell may be adjacent to the core 110, and $Zn_jSe_kS_l$ layer may be adjacent to the outer-shell.

An example of the core 110 and the shell 120 formed to have a multilayer structure according to an embodiment is described below with reference to FIG. 2.

FIG. 2 illustrates a quantum dot according to another embodiment of the present invention.

In other words, FIG. 2 illustrates another embodiment of the quantum dot of the present invention described with reference to FIG. 1. Hereinafter, parts, which overlap with the contents described in FIG. 1, of contents described with reference to FIG. 2 are omitted.

Referring to FIG. 2, a quantum dot 200 according to another embodiment includes an inner-core 210, an outer-core 220 surrounding the inner-core 210, an inter-shell 230 surrounding the outer-core and an outer-shell 240 surrounding the inter-shell 230, wherein at least one of the inner-core 210, the outer-core 220, an interface between the inner-core 210 and the outer-core 220, and an interface between the outer-core 220 and the inter-shell 230 may be doped with a luminescent group I dopant 250. For example, the luminescent group I dopant 250 may be a salt combined with a halide-based anion based on a potassium (K) metal.

Preferably, all of the inner-core 210, the outer-core 220, an interface between the inner-core 210 and the outer-core 220, and an interface between the outer-core 220 and the inter-shell 230 may be doped with the luminescent group I dopant 250.

In addition, the luminescent group I dopant 250 may include at least one of KI, KF, KCl, KBr, $KPF_6$, $KPI_6$, $KPCl_6$, $KPBr_6$ and combinations thereof.

The luminescent group I dopant 250 may be doped at a concentration of 0.1% to 10% relative to a cation concentration of the inner-core 210 and the outer-core 220.

For example, the inner-core 210 may include an $In_aP_b$ compound, the outer-core 220 may include an $In_cP_d$ compound, and the outer-shell 240 may include a ZnS compound.

In addition, the inter-shell 230 may be formed to have a $Zn_eSe_f/Zn_gSe_hS_i/Zn_jSe_kS_l$ multilayer structure. Here, the $Zn_eSe_f$ layer may be adjacent to the outer-core 220, and the $Zn_jSe_kS_l$ layer may be adjacent to the outer-shell 240.

FIGS. 3A to 3B illustrate optical characteristics of quantum dots according to an embodiment of the present invention.

Referring to FIGS. 3A to 3B, reference numeral 310 illustrates absorbance spectra of quantum dots according to an embodiment obtained by UV-visible spectroscopy, and reference numeral 320 illustrates photoluminescence (PL) spectra of quantum dots according to an embodiment.

Each of the quantum dots according to the embodiments of reference numerals 310 to 320 may include a core, an inter-shell, and an outer-shell. Here, an interior of the core and an interface between the core and the inter-shell may be doped with a luminescent group I dopant. For example, the luminescent group I dopant may be a salt combined with a halide-based anion based on a potassium (K) metal.

The following Table 1 shows doping concentrations of the luminescent group I dopants doped in the quantum dot cores, and the following Table 2 shows optical characteristics of quantum dots according to the types of the doped luminescent group I dopants.

TABLE 1

| Sample | ICP-AES ($In^{3+}$ relative composition) K/In |
|---|---|
| Undoping InP core | nd |
| KOA doped InP core | 0.048 (4.8%) |
| KI doped Inp core | 0.061 (6.1%) |

TABLE 2

| Doping material | Core/inter-shell/outer-shell | λ | QY | FWHM |
|---|---|---|---|---|
| Undoping | InP/ZnSe/ZnSeS/Zns | 617 nm | 77% | 43 nm |
| Potassium phosphate ($K_3PO_4$) | | 618 nm | 75% | 45 nm |
| potassium nitrate ($KNO_3$) | | 617 nm | 78% | 43 nm |
| Potassium carbonate ($K_2CO_3$) | | 616 nm | 81% | 43 nm |
| Potassium oleate (KOA) | | 618 nm | 86% | 42 nm |
| Potassium hexafluorophosphate ($KPF_6$) | | 624 nm | 88% | 43 nm |
| Potassium iodide (KI) | | 626 nm | 91% | 44 nm |

From Table 1, it can be confirmed that the quantum dots core-doped with the salts (luminescent dopants) combined with the halide-based anions based on KOA and KI metals are respectively doped with the luminescent dopants at concentrations of 4.8% and 6.1% relative to the cation ($In^{3+}$).

Referring to reference numerals 310 to 320 and Table 2, it can be confirmed that the quantum dots doped with the salts (luminescent dopants) combined with halide-based anions based on $KPF_6$ and KI metals exhibit red shift in emission wavelengths (λ), compared to conventional quantum dots (undoping), by increased core sizes due to addition of the luminescent dopants. In addition, it can be confirmed that the halide-based salts (luminescent dopants) based on $KPF_6$, and KI metals serve to prevent defect and strain present inside the cores and at interfaces between the cores and the shells, resulting in an increased quantum yield (QY) of 80% or higher through minimization of photon scattering.

FIG. 4 illustrate a method of manufacturing quantum dots according to an embodiment of the present invention.

In other words, FIG. 4 illustrates a method of manufacturing the quantum dots of the present invention described with reference to FIGS. 1 to 3. Hereinafter, parts, which overlap with the contents described in FIGS. 1 to 3, of contents described with reference to FIG. 4 are omitted.

Referring to FIG. 4, in step 410 of the method of manufacturing quantum dots according to an embodiment, a core may be formed.

For example, the core may include at least one of a group III-V compound, a group II-VI compound, a group II-III-VI compound, a group III-III-VI compound and combinations thereof.

More particularly, the group III-V compound may include at least one of a binary compound selected from among GaN, GaP, GaAs, GaSb, AlN, AlP, AlAs, AlSb, InN, InP, InAs, InSb and combinations thereof, a ternary compound selected from among GaNP, GaNAs, GaNSb, GaPAs, GaPSb, AlNP, AlNAs, AlNSb, AlPAs, AlPSb, InGaP, InNP, InNAs, InNSb, InPAs, InPSb and combinations thereof, and a quaternary compound selected from among GaAlNP, GaAlNAs, GaAlNSb, GaAlPAs, GaAlPSb, GaInNP, GaIn-NAs, GaInNSb, GaInPAs, GaInPSb, InAlNP, InAlNAs, InAlNSb, InAlPAs, InAlPSb and combinations thereof.

In addition, the group II-VI compound may include at least one of a binary compound selected from among CdSe, CdTe, ZnO, ZnS, ZnSe, ZnTe, HgS, HgSe, HgTe, MgSe, MgS and combinations thereof, a ternary compound selected from among CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and combinations thereof, and a quaternary compound selected from among HgZnTeS, CdZnSeS, CdZnSeTe, CdZnSTe, CdHgSeS, CdHgSeTe, CdHgSTe, HgZnSeS, HgZnSeTe, HgZnSTe and combinations thereof.

Preferably, the core formed in step 410 of the method of manufacturing quantum dots according to an embodiment may include an InP compound.

When a core precursor and a solvent are mixed and reaction is allowed to proceed at a predetermined temperature in step 410 of the method of manufacturing quantum dots according to an embodiment, a luminescent group I dopant is injected to form a core doped with a luminescent group I dopant.

For example, the luminescent group I dopant may be a salt combined with a halide-based anion based on a potassium (K) metal and may be doped at concentration of 0.1% to 10% relative to a cation of the core.

In other words, the luminescent group I dopant may be injected in a core synthesis process for more accurate injection into the core.

For example, the core precursor may include a mixture of a group III element precursor and a group V element precursor or a mixture of a group II element precursor, a group III element precursor and a group VI element precursor.

In addition, the solvent may be selected from among C6 to C22 primary amines such as hexadecylamine, C6 to C22 secondary amines such as dioctylamine, C6 to C40 tertiary amines such as trioctylamine, nitrogen-containing heterocyclic compounds such as pyridine, C6 to C40 aliphatic hydrocarbons (e.g., alkane, alkene, alkyne, etc.) such as hexadecane, octadecane, octadecene and squalene, C6 to C30 aromatic hydrocarbons such as phenyldodecane, phenyltetradecane, and phenyl hexadecane, phosphines, such as trioctylphosphine, substituted with a C6 to C22 alkyl group, phosphine oxides, such as trioctylphosphine oxide, substituted with a C6 to C22 alkyl group, C12 to C22 aromatic ethers such as phenyl ether and benzyl ether, and combinations thereof.

Meanwhile, in step 410 of the method of manufacturing the quantum dots according to an embodiment of the present invention, inner-cores may be formed, and an outer core surrounding each of the formed inner-cores may be formed.

For example, in step 410 of the method of manufacturing quantum dots according to an embodiment, an inner-core including an $In_aP_b$ compound, where a and b are positive real numbers, and an outer-core including an $In_cP_d$ compound, where c and d are positive real numbers satisfying a>c and b>d, may be formed.

In particular, in step 410 of the method of manufacturing the quantum dots according to an embodiment of the present invention, 0.3 mmol of indium acetate, 10 mL of 1-octadecane (ODE) and 0.9 mmol of palmitic acid (PA) may be fed into a 3-neck flask, followed by heating to 150° C. under vacuum. After one hour, the atmosphere in the reactor may be converted to nitrogen (N2).

Next, in step 410 of the method of manufacturing the quantum dots according to an embodiment of the present invention, 0.15 mmol of a tris(trimethylsilyl)phosphine (TMS3P) solution may be rapidly injected after heating to 320° C. and reaction may be allowed to proceed, thereby forming inner-cores (first InP core).

Next, in step 410 of the method of manufacturing the quantum dots according to an embodiment of the present invention, an outer-core mixture solution including 0.2 mmol of indium acetate, 5 mL of 1-octadecane (ODE), 0.6 mmol of palmitic acid (PA) and 0.1 mmol of tris(trimethylsilyl)phosphine (TMS3P) may be slowly fed dropwise into a separate inner-core reactor to form outer cores (second InP core).

Meanwhile, in step 410 of forming the inner-core and the outer-core of the method of manufacturing quantum dots according to an embodiment, a potassium halide may be injected in a content of 0.009 mmol.

In step 420 of the method of manufacturing quantum dots according to an embodiment. an inter-shell may be formed on the formed core.

For example, the inter-shell may include at least one of a group II-III-VI compound, a group III-III-II-VI compound and combinations thereof.

More particularly, the inter-shell may include a ZnSe compound, a ZnSeS compound, a ZnTe compound, a ZnTeSe compound, a ZnTeSeS compound and a ZnTeS compound, and an outer-shell may include a ZnS compound. Preferably, the inter-shell may include a ZnSe compound and a ZnSeS compound.

In particular, in step 420 of the method of manufacturing quantum dots according to an embodiment, the core doped with the luminescent group I dopant is mixed with an inter-shell precursor and a solvent and reaction is allowed to proceed at a predetermined temperature, thereby forming an inter-shell surrounding the core.

For example, the inter-shell precursor may be a mixture of a group II element precursor, a group III element precursor, and a group VI element precursor.

Meanwhile, in step 420 of the method of manufacturing quantum dots according to an embodiment, a first inter-shell surrounding the formed core (or outer-core) may be formed, and a second inter-shell may be formed on the formed first inter-shell.

Preferably, the first inter-shell may include a ZnSe layer, and the second inter-shell may include at least one ZnSeS layer.

In particular, a $Zn_eSe_f$ layer, as the first inter-shell, and a $Zn_gSe_hS_i/Zn_jSe_kS_l$ layer, as the second inter-shell, where e, f, g, h, i, j, k, and l are positive real numbers satisfying g=j, h>k, and i<l, may be formed in step 420 of the method of manufacturing quantum dots according to an embodiment.

More particularly, in step 420 of the method of manufacturing the quantum dots according to an embodiment of the present invention, 3 mmol of zinc stearate may be rapidly added to 10 mL of a 1-octadecene mixture solution, followed by allowing reaction to proceed at 330° C. for 30 minutes.

Next, in step 420 of the method of manufacturing the quantum dots according to an embodiment of the present invention, 0.5 ml of 1.6 M Se-TOP may be added and allowed to react at 330° C. for 30 minutes, and 0.06 ml of 1.6 M Se-TOP and 2 ml of 2 M S-TOP may be continuously added and allowed to react for 120 minutes, thereby forming the first inter shells (ZnS) and the second inter shells (ZnSeS).

Meanwhile, in step 420 of the method of manufacturing the quantum dots according to an embodiment of the present invention, the quantum dot solution may be rapidly cooled to room temperature after terminating the reaction and ethanol may be added thereto to form a precipitate. The precipitate may be separated by centrifugation and redispersed in hexane or toluene.

In step 430 of the method of manufacturing quantum dots according to an embodiment, an outer-shell may be formed on the formed the inter-shell.

For example, the outer-shell may include a group II-VI compound, preferably a ZnS compound.

In particular, in step 430 of the method of manufacturing quantum dots according to an embodiment, the core on which the inter-shell has been formed is mixed with an outer-shell precursor and a solvent and reaction is allowed to proceed at a predetermined temperature, thereby forming an outer-shell surrounding the inter-shell.

For example, the outer-shell precursor may be a mixture of a group II element precursor and a group VI element precursor.

In conclusion, since an interior of a core and an interface between the core and a shell are doped with a luminescent group I dopant according to the present invention, crystal strain can be minimized.

In addition, optical characteristics including quantum yield can be improved due to doping with a luminescent group I dopant.

Although the present invention has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

The invention claimed is:

1. A quantum dot, comprising a core; and a shell surrounding the core, wherein at least one of an interior of the core and an interface between the core and the shell is doped with a luminescent group I dopant,
   wherein the luminescent group I dopant comprises one or more selected from the group consisting of KI, KF, KCl, KBr, $KPF_6$, $KPF_6$, $KPCl_6$, and $KPBr_6$.

2. The quantum dot according to claim 1, wherein the core is formed by injecting the luminescent group I dopant in a process of reacting a group III element precursor with a group V element precursor.

3. The quantum dot according to claim 1, wherein the luminescent group I dopant is doped at a concentration of 0.1% to 10% relative to a cation of the core.

4. The quantum dot according to claim 1, wherein the core comprises one or more selected from the group consisting of a group III-V compound, a group II-VI compound, a group II-III-VI compound, and a group III-III-II-VI compound.

5. The quantum dot according to claim 1, wherein the core is formed to have a multilayer structure.

6. The quantum dot according to claim 5, wherein the core comprises an inner-core comprising an $In_aP_b$ compound, where a and b are positive real numbers, and an outer-core comprising an $In_cP_d$ compound, where c and d are positive real numbers satisfying a>c and b>d.

7. The quantum dot according to claim 1, wherein the shell comprises one or more selected from the group consisting of a group II-VI compound, a group II-III-VI compound, and a group III-III-II-VI compound.

8. The quantum dot according to claim 1, wherein the shell comprises an inter-shell; and an outer-shell surrounding the inter-shell.

9. The quantum dot according to claim 8, wherein the inter-shell comprises one or more selected from the group consisting of a group II-III-VI compound, and a group III-III-II-VI compound, and wherein the outer-shell comprises a group II-VI compound.

* * * * *